United States Patent Office 3,335,087
Patented Aug. 8, 1967

3,335,087
METHOD OF STRIPPING RESINS
James Joseph Keers, Jr., Hilltown Township, Bucks County, Pa., assignor to Pennsalt Chemical Corporation, Philadelphia, Pa., a corporation of Pennsylvania
No Drawing. Filed Dec. 20, 1965, Ser. No. 515,148
3 Claims. (Cl. 252—143)

This invention relates to new compositions and methods for the removal of resins adhering to substrates and containers. More particularly, the present invention relates to the use of substantially anhydrous compositions comprising hydrofluoric acid and hydroxy aromatic compounds for the removal of resin coatings, glues, foams and encapsulating media especially those which are epoxy or urethane-based.

This application is a continuation-in-part of my copending application S.N. 316,430, filed Oct. 15, 1963, for Chemical Compositions and Methods for Their Use, now abandoned.

Compositions for the removal of coatings and adherent resins which are now commercially available include solvent compositions such as methyl ethyl ketone, turpentine, naphtha, etc.; alkali-based compositions including principally those based on sodium hydroxide with a variety of additives; and less widely used compounds for the removal of more resistant coatings including those containing organic acids such as formic acid, or lactic acid. The solvent compositions are well known, the alkali-based compositions are typified by those disclosed in U.S. Patent 2,962,395 issued to Lewis J. Brown, and the organic acid formulations are typified by those disclosed in U.S. Patent 2,418,138 issued to Howard Packer.

Certain new, highly resistant coatings including principally those based on epoxies and urethanes cannot be effectively and efficiently removed by the existing commercial compositions. Widespread and increasing demand for effective removing agents for these highly resistant coatings now exists, particularly in the fields of air transportation and space research where periodic removal of coatings from aircraft and spacecraft is reqiured for purposes of inspection.

The organic solvent type of commercial paint stripper is almost entirely ineffective in removing these new, highly resistant coatings and none of the alkaline stripper removes the highly cross-linked coatings with sufficient efficiency to permit its commercial application. The most active of the organic-acid type paint removers barely soften these coatings.

Research in the field of coating removal compositions directed toward filling the above-described need for removal agents for these new, highly resistant coatings has led to the discovery of the substantially anhydrous hydrofluoric acid containing compositions disclosed in application Ser. No. 294,226 filed July 7, 1963, by H. C. Mandell, Jr. The new compositions disclosed in that application permit the efficient removal of a wide variety of the highly resistant coatings and are capable of accomplishing this result without substantial corrosion of the metallic substrates on which such coatings are generally supported.

The coating removal compositions disclosed in the Mandell application comprise hydrofluoric acid, an inert immiscible organic solvent and, preferably, contain a solubilizing agent to permit the solution of the hydrofluoric acid in the immiscible organic solvent, and additionally, to reduce the fuming which is caused by the reaction of hydrofluoric acid with the moisture contained in air over coating removal baths, spray booths, etc.

It has now been found that by the selection of a particular class of solubilizing agents, a substantial unexpected enhancement in the efficiency of the compositions can be obtained. Further, compositions containing these selected solubilizing agents are capable of rapidly stripping certain specialized coating systems which cannot be rapidly and effectively stripped by other formulations. Such coating systems include certain epoxy and urethane coatings which are bonded to metallic substrates by means of phosphate, anodized or conversion-type base coatings.

The present invention comprises the discovery of extremely active and efficient compositions for removal of adherent resins. These compositions are substantially anhydrous and comprise hydrofluoric acid, at least one inert organic solvent, and at least one hydroxy substituted aromatic compound used as a solubilizing agent.

By substantially anhydrous is meant compositions which contain not more than about 3% by weight and preferably not more than about 1% by weight of water.

By inert organic solvents is meant organic materials which, at ordinary temperatures, are in the liquid state, are capable of softening the resin coating, and which are not appreciably attacked by the hydrofluoric acid. In addition to these characteristics, the solvent employed should also preferably have a lower vapor pressure so as to avoid excecessive fuming of the composition. For this reason, solvents boiling above about 100° F. are preferred. From the standpoint of cost, their effectiveness in softening the resin coating and their resistance to attack by HF, and the preferred general types of inert organic solvents for use in the invention are chlorine substituted hydrocarbons, both aliphatic and aromatic and aromatic hydrocarbons.

Of a wide variety of solvents studied, a class combining good resin softening properties, a high degree of inertness to HF and low cost is the class consisting of alpha, omega dichloroalkanes, that is, compounds consisting only of chlorine, carbon and hydrogen atoms in which a chlorine atom is attached only to the terminal carbon atoms at each end of the molecule. The lowest molecular weight compound in this class is dichloromethane, more commonly called methylene chloride. Other compounds in order of ascending molecular weight are: 1,2-dichloroethane; 1,3-dichloropropane; 1,4-dichlorobutane; 1,5-dichloropentane; and 1,6-dichlorohexane.

A general class of inert organic solvents suitable for my invention is the chlorine substituted aliphatic hydrocarbons of $C_1$ through $C_6$ carbon content which are liquids at room temperature and which are relatively inert to hydrofluoric acid. This group includes monochloro, dichloro, trichloro and tetrachloro substituted aliphatic hydrocarbons. Within this general class, the chlorine substituted saturated aliphatic hydrocarbons of $C_1$ through $C_6$ carbon content which are liquids at room temperature and which are relatively inert to hydrofluoric acid are useful as inert organic solvents in my compositions and processes.

I have also found that trichloroethylene, and tetrachloroethylene, which are chlorine substituted unsaturated hydrocarbons of $C_2$ carbon content, are suitable inert organic solvents useful in my invention.

Suitable inert organic solvents of the general class of chlorine substituted aliphatic hydrocarbons of $C_1$ through $C_6$ carbon atoms include chloroform, carbon tetrachloride, 1,1-dichloroethane, 1,1-dichloropropane, 1,2-dichloropropane, 2,2-dichloropropane, 1,1,1-trichloroethane, 1,1,2-trichloroethane 1,1,2-trichloroethylene, perchloroethylene, 1-chlorobutane, 1,4-dichlorobutane, 1,2-dichlorohexane, monochloropentane, 3.4-dichlorohexane, 1,1-dichloropentane, 1,2-dichloropentane, 1,1,3-trichlorobutane, 1,2,3-trichlorobutane, 1,2,3-trichloropropane, 1,1,2,2-tetrachloropropane, 1,1,2,3-tetrachloropropane and 1,1,1,2-tetrachlorobutane.

Suitable chlorine substituted inert aromatic solvents include, for example, ortho-dichlorobenzene, monochlorobenzene, monochlorotoluene, monochloroxylene and monochloroethylbenzene. Ortho-dichlorobenzene is an excellent organic solvent particularly useful in my invention where a solvent with low volatility is desired. This solvent is highly inert to hydrofluoric acid and also has excellent ability to soften resin coatings.

Suitable inert organic aromatic hydrocarbon solvents include, for example, benzene, toluene, xylene, ethyl benzene, ortho-ethyltoluene, diethyl benzene, isopropyl benzene, and the like. The lower alkyl substituted benzenes boiling at 176° F. or higher are preferred to the lower boiling benzenes because of their higher flash points.

By solubilizing agents is meant agents which permit formation of solutions of hydrofluoric acid in the inert immiscible organic solvents without deleteriously reacting with the acid. These solubilizing or coupling agents combine with the HF to form a loosely bound non-ionic adduct through an unshared pair of electrons of the oxygen atom which is soluble in the HF-immiscible solvent, permitting the formation of a stable, one-phase system which continuously releases free HF during the resin stripping operation through dissociation of the adduct.

By hydroxy aromatic compounds is meant those compounds which are substantially inert to hydrofluoric acid, which contain at least one aromatic ring and which contain at least one hydroxy group substituted onto an aromatic ring. In general, the hydroxy aromatic compounds having boiling points within the range of 180° C. to 350° C. are suitable in the practice of my invention.

A preferred class of hydroxy aromatic compounds suitable for use in my compositions and processes are the hydroxy aromatic compounds from the class consisting of phenols, naphthols, and the lower alkyl substituted phenols and naphthols having boiling points between the range of 180° C. to 350° C. By lower alkyl is meant alkyl substituents having from one to four carbon atoms.

Suitable hydroxy aromatic compounds within the broad class of hydroxy aromatic compounds include phenols, naphthols, xylenols, cresols, and substituted phenols and naphthols, such as the nitro substituted and lower alkyl substituted phenols and naphthols where lower alkyl means an alkyl group having from one through four carbon atoms.

Suitable species of compounds within the broad class of hydroxy aromatic compounds include phenol, alpha and beta naphthol, ortho, meta and para cresol, 1,2-dihydroxybenzene, 1,3-dihydroxybenzene, 1,4-dihydroxybenzene, 1,2,3 - trihydroxybenzene, ortho - nitrophenol, meta-nitrophenol, para - nitrophenol, 2,3-dinitrophenol, 2,4-dinitrophenol, 2,6 - dinitrophenol, 3,4-dinitrophenol, 3,5-dinitrophenol, 2,3-dimethylphenol, 2,4-dimethylphenol, 2,5-dimethylphenol, 2,6-dimethylphenol, 3,4-dimethylphenol, 3,5-dimethylphenol, 2,3-diethylphenol, 2,4-diethylphenol, 2,5-diethylphenol, 2,6-diethylphenol, 3,4-diethylphenol, 3,5-diethylphenol, 3-methyl-4-nitrophenol, 3-methyl-5-nitrophenol, 3-methyl-6-nitrophenol, 4-methyl-2-nitrophenol, 4-methyl-3-nitrophenol, 2-methyl-3-nitrophenol, 2-methyl-4-nitrophenol and 2-methyl-5-nitrophenol.

The above group of compounds, of course, contains many species of the preferred class of compounds consisting of phenols, naphthols, and the lower alkyl substituted phenols and naphthols.

On the basis of economy and efficiency the most preferred hydroxy aromatic compounds are: phenol, naphthol, and cresol.

The hydroxy aromatic compounds are preferably used in amounts ranging from about 0.1 to 2.0 moles of hydroxy aromatic compound per mole of hydrofluoric acid with amounts of about 0.5 mole of hydroxy aromatic compound per mole of hydrofluoric acid being most preferred. Obviously, the minimum amount of solubilizing agent will be that amount necessary to place the hydrofluoric acid into solution. Solubilizing agent in excess of 2 moles per mole of hydrofluoric acid may be used if desired since the solubilizing agents are soluble in the inert organic solvents. As indicated above, mixtures, of solubilizing agents, as well as the use of a single solubilizer, are useful in the practice of my invention.

The preferred percentage of hydrofluoric acid in the stripping compositions will be from about 0.05 to about 20% by weight with the range of from 1.0 to about 10% being most preferred. However, the concentration of hydrofluoric acid is not narrowly critical and higher and lower concentrations may be found convenient under specialized circumstances. For example, whenever my stripping baths become low in hydrofluoric acid, it is convenient to fortify them with a concentrate in which the hydrofluoric acid concentration can be as high as forty percent by weight with the balance being inert organic solvents of the types described above and hydroxy aromatic solubilizing agents for the hydrofluoric acid as described above. In these concentrates the mole ratio of solubilizing agent to hydrofluoric acid will also vary within the range of 0.1 to 2.0. A particularly useful concentrate contains anhydrous hydrofluoric acid—25% by weight, methylene chloride—25% by weight and phenol—50% by weight.

The preferred stripping compositions of the present invention will therefore contain from 0.05 to about 20% by weight of hydrofluoric acid, and about 0.1 to 2.0 mole of hydroxyaromatic solubilizing compound per mole of hydrofluoric acid with the remainder of the composition being an alpha-omega-dichloroalkane plus any other additives which may be found convenient.

Such additives may include paraffin waxes in order to form thin skins across the surface of the hydrofluoric acid-containing formulations and further reduce fuming on contact with moist air and to reduce evaporation; surfactants to permit penetration of the formulation into fine crevasses and otherwise inaccessible areas and to aid in rinsing; and thickening agents to increase the viscosity for certain specialized uses of the resin-removing formulations.

The compositions of the present invention have all of the valuable advantages of the hydrofluoric acid-containing compositions disclosed and claimed in the above mentioned co-pending application. That is, they are capable of rapidly removing resinous deposits and coatings from substrates, particularly steel, aluminum and magnesium metals, without harm to the substrate. Also, they appear to function by removal of the coating from the surface in large pieces which rapidly and easily slough off. This removal appears to be accomplished by attacking the bond rather than by disintegration of the adherent film into many particles with a consequent high consumption of the removing formulation. In addition, the compositions of the present invention, by a synergistic type of action which has not been completely explained, function even more rapidly and efficiently than hydrofluoric acid-containing compositions which do not include hydroxyaromatic compounds. This enhanced ability of the formulations of the present invention is illustrated by Examples 1, 2, 3 and 4. Also, as illustrated by Example 5 the hydroxyaromatic-hydrofluoric acid compositions of the present invention are capable of removing certain tightly bonded highly resistant coatings which cannot be removed rapidly by the use of formulations not containing hydroxy aromatic compounds.

Room temperature and atmospheric pressure will be preferred for most applications of the invention. In most cases, the liquid phase will be preferred for the process of the present invention but in certain specialized applications it may be found convenient to remove adherent resins by condensing the formulation from the vapor phase onto the resin to be removed in a manner similar to that commonly used in vapor phase cleaning.

The compositions of the present invention will preferably be applied to the resin to be removed by dipping the resin-covered substrate into the compositions, or by spraying or flowing the compositions over the resin coating. Brushing and roller coating are less preferred methods which can be used. Contact time between the acid and resin will generally be about 1 to 30 minutes, but is in all cases determined by the length of time required to loosen the resin from the substrate, and is not narrowly critical.

Agitation of either the workpiece or the compositions will be preferred in most applications to cause the resinous coatings to slough off with a minimum expenditure of the formulation values.

The clean substrates should be rinsed immediately in an inert organic solvent, in rapidly running water, or in alkaline solutions. Parts covered with the compositions of the present invention should never be permitted to stand for long in contact with moist air since they may absorb moisture and form aqueous hydrofluoric acid which will attack most substrates.

An important aspect of the present invention is its ability to remove highly resistant resins without substantially corroding the substrates. By this is meant that the substrates, after the resin is removed, retain virtually all of their previous strength and are suitable for their intended purpose. Where the resins have been applied over oxide-, conversion- or similar bonding coatings, the bonding coatings will, in some instances also be removed.

It should be understood that the method of the present invention is capable of removing from surfaces, adherent resins of a wide variety of chemical compositions, including the great majority of commercially available coatings, foams, encapsulating compounds, and glues. Because of their wide commercial use, and the ability of the compositions of the present invention to remove them with particular efficiency, resins of the following compositions are especially susceptible to removal by practice of the present invention: epoxies, urethanes, phenolics, polycarbonates, polyesters, acrylics, neoprenes, silicone elastomers (nylons, polyvinyl chlorides, polyvinyl alcohols, and copolymers of the above.

By urethanes is meant resins which are based on polymerized ethyl carbamate and which therefore contain repeating units having the structure —NCO—.

By phenolics is meant resins made from phenols, including phenol, m-cresol, p-cresol, resorcinol, and similar compounds; and generally produced by condensation with an aldehyde including formaldehyde, acetaldehyde, benzaldehyde, and furfuraldehyde.

By acrylics is meant resins formed by the polymerization of monomeric derivatives of acrylic acid or of alpha methyl acrylic acid or of other homologs of acrylic acid.

By nylon is meant any long chain synthetic polymeric amide having recurring amide groups as an integral part of the main polymer chain.

By neoprenes are meant those elastomeric type polymers which are basically polymers of chloroprene.

By polyvinyl chloride is meant polymers derived substantially from vinyl chloride.

By polyester resins is meant those produced by the polymerization of long chain poly basic acids, including sebacic, with polyhydric alcohols including glycol and glycerine with or without simultaneous polymerization of an admixed compound such as styrene.

By silicone elastomers is meant polymers built on a structure of alternate silicon and oxygen atoms with various organic groups attached to the unsaturated valences of the silicon atoms. The polymers may be cyclic linear or cross linked in a wide variety of molecular weights including materials known commercially as silicone rubbers.

By epoxies is meant resins produced by the polymerization of an epoxide, including such compounds as ethylene oxide and epichlorohydrin, particularly with a diphenol. The chemical structure of epoxy resins is characterized by 3-membered rings consisting of two carbon atoms and 1 oxygen atom.

By polycarbonates is meant those polymers which are characterized by a substantial number of —O—CO—O— groups in the molecule.

The following examples are illustrative of my invention:

Example 1

A formulation of the present invention is prepared consisting of 85 parts by weight of dichloroethane, 8 parts by weight of phenol, 4 parts by weight of hydrofluoric acid, and 3 parts by weight of crude scale wax. This formulation strips from aluminum, magnesium and steel substrates, a variety of epoxy, epoxy-primer plus topcoat and polyurethane coating systems which are only softened by several hours' exposure to commercially available alkaline and organic acid paint strippers. The substrates are not substantially corroded, and are free of resin within minutes in all cases.

Similar results are obtained when the dichloroethane in the above formulations is replaced with dichloromethane.

Example 2

Results similar to those described in Example 1 are obtained when approximately equal molar amounts of naphthol are substituted for the phenol used in Example 1.

Example 3

When the tests of Examples 1 and 2 are repeated using formulations which contain molar amounts of cresol in substitution for the phenol and naphthol, similar results are obtained.

Example 4

When equal molar quantities of each of the following Lewis Bases are substituted for the hydroxyaromatic compounds of Examples 1, 2 and 3, stripping of similar panels is noticeably slower; bis beta dichloroethyl ether, 1-4 dioxane, nitromethane, dimethyl formamide, tetra methylene sulfone, pyrrolidine.

Example 5

Anodized aluminum panels, phosphatized steel panels, and magnesium panels covered with conversion coating prepared by the Dow 7 or Dow 17 process of the Dow Chemical Company are coated with a commercial epoxy primer-epoxy topcoat system designated Super Koropan De Soto Chemical Coatings Inc. A second group of similar panels is coated with a polyurethane coating system applied in conformance with MIL–P–27316 and MIL–C–27227, specification of the U.S. Government.

When one complete set of cured panels is immersed in a conventional phenol-containing coating removal formulation consisting of 10 parts by weight of phenol and 10 parts by weight of 90% formic acid and 80 parts of dichloromethane some of the coatings are softened but none of the epoxy or urethane coating is satisfactorily removed.

When a second set of panels is immersed in a paint removing formulation consisting essentially of about 10% by weight hydrofluoric acid, and an equal molar quantity of bis-beta-dichloroethyl ether, with the remainder being dichloromethane, all of the panels are eventually stripped of resin except the magnesium panels which were conversion coated before application of the epoxy and the urethane coating systems.

When a paint removing formulation according to the present invention consisting essentially of 10% by weight hydrofluoric acid, and an equal molar quantity of phenol with the remainder being dichloromethane, all of the panels are stripped noticeably more rapidly than with the preceding two formulations. The oxidized magnesium panels coated with epoxy and polyurethane systems are completely and effectively stripped.

Example 6

The following resin stripping solutions and emulsions were prepared by first placing the inert organic solvent in a polyethylene lined beaker to which the solubilizing agent was added if used. Mechanical agitation placed the solvent and solubilizer in solution and to this was added weighed amounts of liquid anhydrous hydrofluoric acid. There was a pronounced initial acid fuming which gradually was reduced to a minimum as solution of the hydrofluoric acid took place in the agitated inert organic solvent-solubilizer system. Solution generally took place in from ¼ to five minutes. After the hydrofluoric acid fuming had considerably dropped off, stirring was discontinued.

Alodized aluminum strips which were previously coated with a baked Sherwin-Williams epoxy primer Aero Caticoat System were immersed in stripping compositions prepared in the manner described above. The time required to strip the epoxy coating is noted in the table. The epoxy coated substrates were placed in the stripping compositions at room temperature, i.e., 70 to 75° F., and the coated substrates were closely observed until the resin coatings were substantially removed and floated to the surface. The tests are set forth in Table 1.

It should be understood that the invention is adaptable to a wide range of modifications and variations and that the preceding examples are intended only to illustrate the invention and are not to restrict it in any manner or to any degree.

I claim:

1. The method of removing an adherent resin from a substrate without appreciable corrosion of the substrate by contacting the said resin for a time sufficient to loosen the resin with a substantially anhydrous stripping solution in which the principal ingredients consist essentially of hydrofluoric acid, 0.05 to 75% by weight, at least one hydroxy aromatic compound having boiling points within the range of 180° C. to 350° C. and selected from the group consisting of phenol, naphthol, cresol, xylenol, lower alkyl and nitro substituted phenols, naphthols, cresols, and xylenols and dihydroxy and trihydroxy benzenes acting as a solubilizing agent for said hydrofluoric acid and the balance being at least one inert organic solvent selected from the group consisting of chlorine substituted hydrocarbons, benzene and lower alkyl substituted benzenes, said hydroxy aromatic compound being present in concentrations of at least 0.1 to 2 moles per

TABLE 1

| Test No. | Stripping Composition | | | | | Stripping Time |
|---|---|---|---|---|---|---|
| | Anhydrous HF, Percent by Wt. | Inert Organic Solvents | Percent by Wt. | Solubilizers | Percent by Wt. | |
| 1 | 0.1 | Methylene Chloride | 99.9 | | | 1 hour. |
| 2 | 4 | Orthodichlorobenzene | 88 | Beta Naphthol | 8 | 1 minute. |
| 3 | 4 | 1,1,2-trichlorethane | 88 | Mixture of Metacresol and Paracresol | 8 | Do. |
| 4 | 4 | 1,2,3-trichlorpropane | 88 | Phenol | 8 | 2 minutes. |
| 5 | 2 | Methylene Chloride | 97 | do | 1 | Instantly. |
| 6 | 1 | do | 89.5 | do | 9.5 | 10-15 minutes. |
| 7 | 4 | Benzene | 88 | Mixture of Metacresol and Paracresol | 8 | 2 minutes. |
| 8 | 4 | Xylene | 96 | | | 3 minutes. |
| 9 | 25 | Methylene Chloride | 50 | Phenol | 25 | Instantly. |
| 10 | 50 | do | 25 | do | 25 | Do. |
| 11 | 75 | do | 15 | do | 10 | Do. |
| 12 | 4 | {Methylene Chloride, Perchlorethylene} | 44, 44 | do | 8 | 2 minutes. |

In none of the above tests was there any noticeable corrosion of the substrates.

Example 7

Using the procedure set forth in Example 6, the efficiency of anhydrous hydrofluoric acid-hydroxy aromatic stripping compositions was tested against aluminum first coated with Alodine 1200 and then with Sherwin Williams epoxy Aero-Coat Primer at 75° F. The results are shown in Table 2.

mole of hydrofluoric acid and in at least sufficient concentration to form a stable one-phase solution including said hydrofluoric acid, said hydroxy aromatic compound and said inert organic solvent, and thereafter removing the said stripping solution and loosened resin from the substrate.

2. The method of claim 1 in which the inert organic solvent is an alpha,omega dichloroalkane of one through six carbon atoms.

TABLE 2

| Test No. | Stripping Composition | | | | | Observations |
|---|---|---|---|---|---|---|
| | Anhydrous HF, Percent by Wt. | Insert Organic Solvent | Percent by Wt. | Solubilizers | Percent by Wt. | |
| 1 | 0.05 | Carbon tetrachloride | 98.95 | Phenol | 1.0 | Paint softened in 3 hours—some blistering at air interface. |
| 2 | 1.0 | Chloroform | 94.0 | Metaparacresol | 5.0 | Strips in 4 minutes. Paint lifted from surface of panel. |
| 3 | 1.0 | 1,5-dichloropentane | 94.0 | Phenol | 5.0 | Strips in 12 minutes. Paint blistered. |
| 4 | 10.0 | {1,1,1-trichlorethane, Methylene chloride} | 50.0, 20.0 | do | 20.0 | Strips instantly. Paint lifted from surface of panel. |
| 5 | 4.0 | Perchlorethylene | 88.0 | do | 8.0 | Strips instantly—paint lifted from surface of panel. No apparent reaction occurs when AHF added to mixture. |
| 6 | 10.0 | Amyl chloride (mixture of 1-,2- and 3-chloropentane) | 75.0 | {Metaparacresol, Betanaphthol} | 10.0, 5.0 | {Strips in 1 minute. Blistering of paint is evident. |
| 7 | 0.05 | Orthodichlorobenzene | 84.95 | Phenol Bis,beta-dichloroethyl ether. | 5.0, 10.0 | Strips in 6 hours—blistering. |
| 8 | 10.0 | {Orthodichlorobenzene, Carbon tetrachloride} | 35.0, 40.0 | Bis,beta dichloroethyl ether. | 5.0 | {Strips instantly. Paint lifted from surface of panel. |
| 9 | 1.0 | 1,4-dichlorobutane | 94.0 | Beta-naphthol, Phenol | 10.0, 5.0 | Strips in 4 minutes. Paint lifted from surface of panel. |
| 10 | 4.0 | Trichlorethylene | 88.0 | Phenol | 8.0 | Strips instantly. Paint lifted from surface of panel. |

3. The method of claim 1 in which the concentration of the hydrofluoric acid varies from 1 to 10% by weight.

References Cited

UNITED STATES PATENTS 2,279,267  4/1942  Kremers.
2,737,499  3/1956  Grubb _____ 252—309
3,072,579  1/1963  Newman _____ 252—143
3,179,609  4/1965  Morison _____ 134—38

FOREIGN PATENTS 834,707  5/1960  Great Britain.

LEON D. ROSDOL, *Primary Examiner.*
W. E. SCHULZ, *Assistant Examiner.*